United States Patent [19]

Mintz et al.

[11] Patent Number: 4,618,432

[45] Date of Patent: Oct. 21, 1986

[54] METHOD AND APPARATUS FOR CHARGING A CONTAMINANT-LADEN LIQUID

[75] Inventors: Donald J. Mintz, Summit; Anthony M. Gleason, Westfield, both of N.J.

[73] Assignee: Exxon Research and Engineering Co., Florham Park, N.J.

[21] Appl. No.: 601,274

[22] Filed: Apr. 17, 1984

[51] Int. Cl.⁴ .................. B01D 17/06; B03C 5/00; B03C 5/02

[52] U.S. Cl. .................. 210/748; 204/186; 204/188; 204/190; 204/302; 210/243; 210/767; 361/226

[58] Field of Search ............ 204/186, 188, 302, 308, 204/190; 210/748, 243; 55/5, 10, 107; 239/3; 361/226, 229, 230

[56] References Cited

U.S. PATENT DOCUMENTS 2,054,273  9/1936  Subkow .................. 204/300
4,255,777  3/1981  Kelly .................... 361/228

OTHER PUBLICATIONS

Hansen, PCT Publication No. WO82/01481, May, 1982.

*Primary Examiner*—Howard S. Williams

[57] ABSTRACT

In order to inject a net unipolar charge, for example using a charge injector (1), into a liquid containing a dispersed contaminant without risk of blockage or arcing in the charge injector which could arise if the contaminated liquid were passed through the charge injector (1) itself, instead a substantially contaminant-free liquid is passed through the charge injector (1) and then the charged contaminant-free liquid brought into contact with the contaminated fluid in a mixing chamber (33), for example. The invention finds particular application in the electrostatic removal of contaminant from a liquid, where the mixing chamber is provided within a separation vessel (6), preferably containing a bed of densely packed beads (32). In the mixing chamber, the contaminants migrate under the influence of the electric field induced in the liquid mixture and conglomerate on the exposed surface of the beads.

25 Claims, 4 Drawing Figures

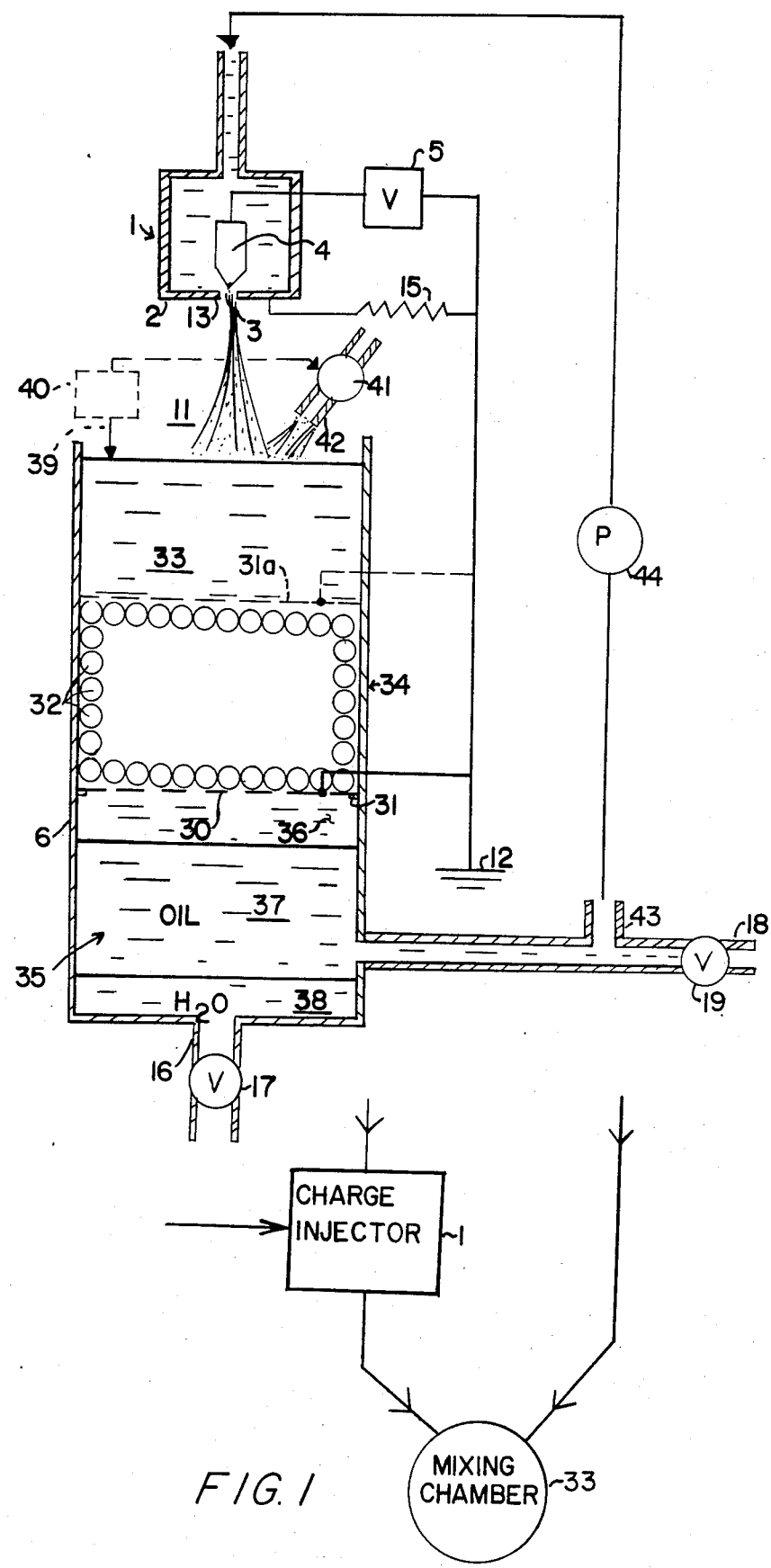

METHOD AND APPARATUS FOR CHARGING A CONTAMINANT-LADEN LIQUID

BACKGROUND OF THE INVENTION

This invention relates to an apparatus and method for charging a liquid laden with a dispersed contaminant. More particularly though not exclusively, the invention finds application to the separation of a dispersed contaminant phase from a phase mixture comprising the contaminant phase dispersed in a continuous liquid phase. The contaminant may be a solid, liquid, gel or gas or any combination of such contaminants coexisting. Examples of contaminants are carbonaceous solids, metals and metal oxides (e.g., alumina fines), composites, water droplets, polymer chains and precipitates (such as wax crystals, asphaltenes, hot filtration sediment, and high molecular weight polar compounds) and gas bubbles. "Liquid phase" is used to indicate that the continuous background phase is liquid. Examples of the application of this invention are the removal of particulate material from a liquid stream or dispersed water droplets from lube stocks and other oils. Further possible applications of the invention are emulsion breakage, dehazing fuel oil, removal of fine particles from refinery process streams, particulate separation in coal liquefaction and oil shale processes, and removal of coagulated metal-rich fractions from residua.

DESCRIPTION OF THE PRIOR ART

Electrostatic free charge injectors are known in the art. An example of such an injector is disclosed in U.S. Pat. No. 4,255,777 obtained from Ser. No. 853,499, filed Nov. 21, 1977 and assigned to the present assignees. The injector is designed to electrostatically charge a liquid stream and discharge it into ambient atmosphere, the stream breaking up into finer droplets or atomising under the influence of the injected free charge to form a spray. The charge injector comprises essentially a chamber through which liquid can flow, a low-voltage electrode at one end of the chamber defining a discharge orifice, a pointed high-voltage, electrode arranged with its tip close to, and in axial alignment with, the discharge orifice and an earthed electrode outside the chamber downstream from the discharge orifice so as to complete the electrical circuit of the charge injector. Various applications of the charge injector are disclosed in U.S. Pat. No. 4,255,777 such as electrostatic coating or spraying or the atomisation of hydrocarbon fuel delivered to the combustion chamber of domestic and industrial oil burners.

Where the fluid to be charged contains dispersed contaminant, however, problems can arise. Thus, where bubbles of contaminant are present, these can cause arcing in the region of the tip of the pointed electrode of the charge injector, which results in a reduction of charge injection efficiency. A similar result might occur with contaminant droplets of high conductivity compared with that of the background continuous fluid phase such that the droplets would tend to provide, periodically, short-circuit paths between the high-voltage electrode tip and the low-voltage electrode. Other liquid contaminants, and also solid particles and contaminant gels can tend to build up deposits around the tip of the pointed electrode and in region of the discharge orifice which, again, can lead to reduced charge injection efficiency and/or blockages.

SUMMARY OF THE INVENTION

The apparatus and method of this invention avoid the aforesaid problems by introducing charge (for example, but not necessarily, using a charge injector) into a further liquid that is substantially free of any dispersed contaminant. Then, however, that liquid and the contaminant-laden liquid which is required to be charged are brought into contact with one another. In this way, a proportion of the charge carried by the further liquid is transferred to the contaminated liquid where it attaches itself predominantly to the dispersed contaminant.

Usually, the charge introduction means comprise a charge injector and the charge injector can be similar to that disclosed in the aforesaid U.S. Pat. No. 4,255,777, which discloses charge injection predominantly or solely by field emission. Thus, the charge injector preferably comprises a high-potential electrode having a pointed end, a low-potential electrode arranged in the proximity of the tip of the high-potential electrode, the low-potential electrode defining a discharge opening close to and in axial alignment with the tip of the high-potential electrode, and means for flowing a stream of the further liquid past the tip of the high-potential electrode and through the discharge opening in the low-potential electrode so that charge is injected from the high-potential electrode tip into the stream of further liquid.

Conveniently, the substantially contaminant-free liquid into which charge is injected is identical to the other liquid apart from the presence of the dispersed contaminant in the other liquid. Then, when the two liquid have been brought together, the resulting fluid mixture is the same as that of the original contaminated stream (except that the contaminant is present in a lower concentration).

However, the two liquids need not necessarily be the same. Normally, the dissimilar, substantially contaminant-free, liquid should at least be non-reactive chemically with the contaminant-laden liquid, although a chemical reaction might in some instances be acceptable or desirable where one or more of the reaction products of that reaction is needed. The dissimilar, contaminant-free liquid can have the additional property that it can be easily and economically separated from the other liquid after the two liquids have been mixed together for transferring charge to the dispersed contaminant, for example by distillation, flashing, membrane separation, evaportion or gravity settling. Particular liquids which are suitable for use in this invention as the contaminant-free fluid will be readily apparent to the man skilled in the art and will not be further described herein.

A particularly convenient way of bringing the two liquids into contact with one another is to use a mixing chamber into which both liquids are introduced.

The apparatus and method as described above find particular application to the clarification of the contaminant-laden steam. In accordance with this technique, the charge injector is aranged to inject net unipolar free charge into the further liquid. A separation vessel defines the mixing chamber and, in this chamber, charge carried by the further liquid transfers to the dispersed contaminants and induces an electric field in the liquid mixture in the mixing chamber such that the charged dispersed contaminant and induced electric field interact to bring about migration of the dispersed contaminants within the liquid mixture. Conglomeration of the contaminants then occurs as is described in more detail hereinbelow. "Conglomeration" as used throughout this specification refers to coalescence or at least agglomeration (without coalescence) in the case of bubbles or liquid droplets of contaminant, and to agglomeration in the case of solids and gels to form contaminant particles of larger size.

Depending on the nature of the contaminant, it will come out of suspension either as bubbles which rise to the surface of the liquid mixture or congregate on collector surfaces in the separation vessel or as droplets or gel-like globules or conglomerated particles which will either rise or, more usually, settle according to the relative densities of the contaminant phase and the liquid with which it is in contact, or collect on collector surfaces in the separation vessel. Such collector surfaces can be for example the exposed surfaces of densely packed beads inside the separation vessel or internal surface areas of the separation vessel itself.

The basis for the effective separation that can be achieved is believed to be as follows. The first step in the process is the production of an excess (i.e. net unipolar—positive or negative) charge density in the otherwise electrically-neutral liquid mixture, usually using the charge injector. It is necessary that there be an excess of free charge in the sense of a sufficient abundance that an effective migration of contaminant will occur in the mixing chamber of the separation vessel. The charge introduced into any stream to be decontaminated must be net negative or net positive. However, providing this requirement is met, then it is equally possible to introduce the excess charge into the substantially contaminant-free liquid using two streams of opposite but unequal levels of charge or alternating net positive and net negative streams for the purposes of agglomeration prior to collection, in the first case, or multilayer precipitation in the second case (e.g., collecting a net negative layer then a net positive layer, and so forth, of dispersed phase).

The second step in the process is the transference of the major portion of the excess charge to the contaminants in the liquid mixture. In a preferred way of performing the invention, the stream issuing from the charge injector passes as a continuous stream or spray through a gas or vapor space, usually an air space, and enters the separation vessel where a body of liquid, comprising a mixture of the substantially contaminant-free and contaminant-laden liquids, is collected. The gas or vapor space is provided to enable the charged liquid to exit the charge injector with high velocity to efficiently sweep out the injected charge and also to eliminate any charge dissipation path back to the charge injector. Such decoupling of the separation vessel from the charge injector is important for achieving a high level and high efficiency of charge injection. It is of no particular importance to the effective removal of contaminant whether the contaminated liquid is sprayed by the charge injector or simply issues as a continuous stream into the separation vessel, particularly at relatively high velocity throughputs in the charge injector. However, when the contaminated liquid is sprayed, the individual liquid droplets are in general separated from one another and this can be important where lower throughput velocities, closer to the drift velocity of the individual charges, are employed. It is, however, remarked that it is necessary that there be no contact between the spray or stream passing through the gas or vapor space and the surrounding separation vessel wall, in order to avoid charge dissipation. Where the continuous background phase is a gas, this can be achieved by introducing a secondary gas flow which provides an inner annular protective sheath on the surrounding wall surfaces. Suitably, the space can be filled with air provided by the ambient atmosphere separating the charge injector from the separation vessel, or it can be enclosed and a purge gas, e.g., nitrogen, circulated through the space to avoid any risk of explosion or chemical reaction. In addition, the purge gas helps to obtain uniform separation results irrespective of changes in ambient conditions, especially humidity, which can affect the rate of depletion of charge where an air space is present. In the absence of any such gap, reduction separation efficiencies will result. According to a development, the gas or vapor space is pressurized which can maintain a satisfactory thoughput rate in the separation vessel even for viscous liquids and can increase the throughput rate for less viscous liquids. In the separation region, it is assumed the excess charge density greatly exceeds the liquid background charge density (i.e. the density of bipolar charge carriers which result in the conductivity of the liquid); then the induced electric field in the separation region caused by the excess charge density will act on the individual charge carriers and drive them towards the boundaries of the liquid mixture. Some of the charge will be intercepted by the individual contaminants of the contaminant dispersion and the contaminants will thereby become charged.

The next part in the process involves the conglomeration of the contaminants. Where the contaminants are present in the liquid mixture at number densities where the mean contaminant—contaminant separation is less than, and preferably significantly less (e.g., 1% or less) than, the internal dimensions of the separation vessel (e.g., its diameter, in the case of an upright cylindrical separation vessel) and assuming no internal collector surfaces within the separation region, agglomeration or coalescence of the contaminants will occur predominantly in the bulk of the liquid mixture to form large particles, droplets or bubbles, as the case may be and less contaminant will reach the separation vessel wall surfaces. "Mean inter-contaminant separation" denotes the arithmetic mean value before any migration of the contaminants following the introduction of free charge, starts to occur. This effect is more pronounced, the higher the contaminant density. For lower contaminant densities, however, a high proportion of the migrating contaminants will reach the wall surfaces and accumulate and conglomerate there, resulting in contaminant deposition on the wall surfaces or, in some cases, detachment of bubbles or droplets of contaminant. In another arrangement, the separation region contains a multiplicity of collector surfaces within the bulk of the liquid mixture in the separation region. The collector surfaces, which can take the form of a bed of densely-packed beads of low conductivity, reduce the mean contaminant migration path length and thereby increase the separation efficiency.

In each instance, the congregation, conglomeration and coalescence may continue until each contaminant either reaches the boundary of the liquid mixture or a collector surface, or increases in size until it becomes separated from the bulk of the liquid mixture by conventional methods such as centrifugation, settling, or mechanical filtering. For liquid contaminants this may conveniently entail settling (or flotation, depending upon the density of the contaminant phase relative to that of the liquid) of the re-entrained liquid contaminants, to form a distinct continuous contaminant phase, to enable separation of the two liquid phases. Alternatively, if insufficient or negligible coalescence occurs, the microscopic liquid droplets merely congregate on the collector and/or wall surfaces. A similar effect may occur where the contaminant is a gas, or the bubbles can coalesce and eventually grow to a size where they become released, due to factors such as buoyancy, from the collector surfaces provided by the separation vessel and/or the beads and/or from within the liquid mixture itself, and can be allowed merely to rise to the surface of the background liquid phase and be collected there as a foam or allowed to escape into the atmosphere. Where the contaminant is a solid, a precipitate of contaminant conglomerate will build-up on collector surfaces. The liquid remaining after treatment in the separation vessel is clarified. Periodic cleaning of the fouled surfaces by backflushing, solvent washing, heating or other techniques can be used to remove the deposited contaminant.

It will be appreciated that the viscosity and conductivity of the background phase need to be relatively low such that conglomeration can occur to a sufficient degree that the contaminant can be removed in a suitable manner as mentioned above before any appreciable leakage or depletion of its charge can take place such as would diminish to an ineffective level the electrical migration force acting on the contaminant. The maximum value of the product of the viscosity and conductivity of the continuous liquid phase would be of the order of $10^{-7}$ centipoise/ohm-meter. In addition, where beads or other collector surfaces are present within the bulk of the liquid mixture, the conductivity of the beads needs to be low, in order not to conduct away the charge in the liquid mixture before adequate contaminant conglomeration has occurred.

It is to be noted that when using a charge injector to introduce the net unipolar free charge, it is important that the stream velocity through the charge injector is high enough to transport the charged stream away from the electrode region of the charge injector. The stream velocity needs to exceed the drift velocity of the individual charges relative to the liquid induced by the electric field produced by the charge injector electrodes. On the other hand, the liquid in the separation vessel needs to remain there long enough to enable contaminant migration to the vessel walls. This requires a much lower velocity throughput in the separation vessel than with charge injector. Typical values for the throughput velocities in the charge injector and separation vessel are 1 cm/sec and 1 m/sec, respectively. In another embodiment the internal cross-sectional diameters of the separation vessel and the injector orifice diameter are for example 10 cm and 0.025 cm, respectively. These are purely exemplary and have no limiting character.

It is stressed that the electric field is the result not of voltage applied to any electrodes, but rather arises from the total introduced or injected charge distribution in the liquid mixture in the separation vessel and on the contaminants and any separation vessel wall surface regions or internal collector surfaces where separation occurs.

In accordance with a preferred feature of the invention, the separation vessel is provided with means responsive to the level of liquid in the primary conglomerating region for regulating the rate of supply of the contaminantfree liquid so as to maintain the level substantially constant. Where collector beads are employed the liquid level preferably just covers all the beads.

In a preferred arrangement, the need for a separate supply of substantially contaminant-free liquid is avoided by re-circulating liquid, in a region of the separation vessel where clarified liquid collects, back through the inlet of the charge injector.

It is to be noted that several different techniques are available for introducing free excess charge that is net unipolar, other than using charge injectors of the kind described above. Broadly speaking, charge introduction methods fall into two general categories, namely: (1) injection of excess charge across the interface or boundary which confines the substantially contaminant-free liquid, and (2) volumetric charge introduction techniques into the bulk of the substantially contaminant-free liquid. Examples of the first category include electron beam and high energy particle radiation, photoemission and charge transport by a moving liquid. Field emission (e.g. as disclosed in the aforesaid Kelly patent), electron beam radiation and photoemission are all examples of electron emission. Examples of the second category are photoionization of either or both of the contaminant and background phases and secondary ionization by thermalization of high energy particle irradiation of the substantially contaminant-free liquid. These examples all involve ionic dissociation within the substantially contaminant-free liquid. The present invention is not restricted to the particular charge injector described above, but also embraces the use of any means, such as falling in the above two categories, for introducing unipolar free excess charge.

It is to be noted that the collector beads need not necessarily be stationary. For example, they can be introduced into the substantially contaminant-free stream before it enters the separation vessel and then removed again at some downstream location, or continuously supplied to, and removed from, the collector bead region within the separation vessel. In another arrangement, the bed of collector beads can be fluidized. Reference is directed to the present assignees' co-pending U.S. pat. application, Ser. No. 601,271, filed on same day as the present application, for further details of a fluidized bed arrangement.

With the present separation technique, it is possible to provide an apparatus and method for the effective separation of dispersed phase from a continuous liquid phase, especially where the mean contaminant size is very small (e.g., of the order of 0.1 to 100 microns in diameter).

The contaminant separation apparatus can be made to be simple in construction and reliable in operation, whilst a contaminant separation method can be provided which is simple to put into effect. With the separation technique, it is possible to attain a high level of purity of the clarified continuous phase.

It will be appreciated that the separation technique is not limited to separating a single contaminant from the mixture. Two or more contaminant species may be separated, providing each of them forms, or the contaminant phases are combined to form, a dispersed phase within the background liquid phase.

BRIEF DESCRIPTION OF THE DRAWINGS

The foregoing and other advantages and benefits of the invention will become apparent from the following description given, by way of example, with reference to the accompanying single drawing, in which:

FIG. 1 is a block diagram, illustrating the principle of the invention.

FIGS. 2 to 4 show, diagrammatically, vertical sections through one form of charge injection arrangement, in which arcing or blocking due to contaminants is avoided, as incorporated in three different kinds of contaminant separation apparatus.

In the Figures, the same references denote the same or corresponding parts.

DESCRIPTION OF THE PREFERRED EMBODIMENTS

Figure 3:
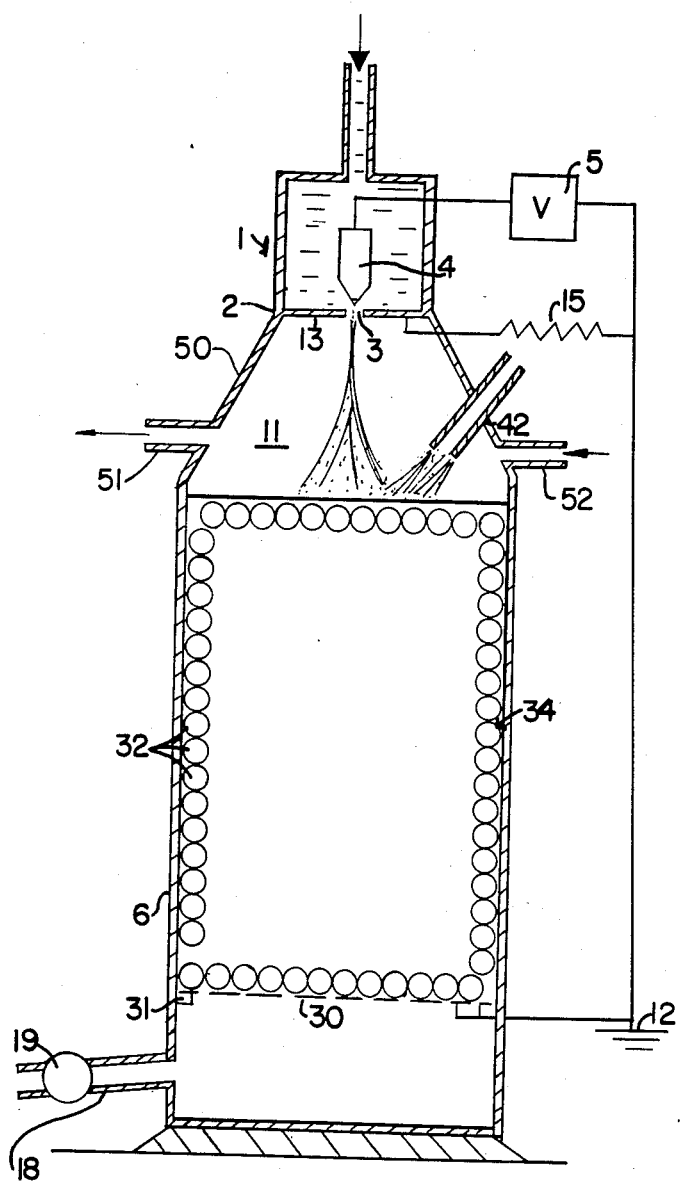

As explained in the introductory part of the specification, when a liquid is passed through a charge injector, such as disclosed in the aforesaid U.S. Pat. No. 4,255,777, any dispersed contaminant in the liquid stream can, over an extended period of time, cause partial or complete blockage of the charge injector or may result in arcing, in either case causing reduction in the charge injection efficiency. This problem is overcome in the arrangement diagrammatically depicted in FIG. 1. Here, a supply line 42 conveys the contaminant-laden liquid to a device 33 which brings that liquid into contact with charged substantially contaminant-free liquid delivered from a charge injector 1 to device 33. Device 33 can be merely a mixing chamber where the two fluids become mixed passively or actively. It will be appreciated, however, that device 33 can be any suitable kind of device, such as are well known in the art, which brings the two fluids into contact with one another.

The liquid that is delivered to charge injector 1 is substantially "contaminant-free" in the sense that it contains no dispersed contaminant or a sufficiently small concentration of such contaminant that the problems of arcing or blockage as referred to above will not occur in the charge injector, even after prolonged operation. Conveniently or in some cases preferably, the substantially contaminant-free liquid is identical to the background liquid of the contaminated liquid with which the contaminant-free fluid is combined in mixing chamber 33.

In operation, a major proportion of the charge introduced into the mixing chamber 33 by the charged contaminant-free fluid transfers to the dispersed contaminant. In this way, the contaminant becomes charged in mixing chamber 33. One preferred application of this technique is in the electrostatic separation of contaminant from the contaminated liquid and three examples of how this can be achieved with practical embodiments will now be described with reference to FIGS. 2 to 4.

Referring to FIG. 2, a mixture consisting of a dispersed contaminant phase in a continuous background phase, in this case a water-in-oil emulsion containing micron-sized water droplets, is delivered through line 42 into a mixing chamber 33 in upper section of an upright, preferably cylindrical, open topped separation reservoir or vessel 6. Separately of the water-in-oil emulsion, oil that is substantially free of water or other dispersed contaminant and is preferably identical to the oil in the water-in-oil emulsion, is introduced into the inlet of charge injector 1 taking the form of a charge injector which injects free charge (net positive or negative) into the mixture. However, it is to be understood that two streams of contaminant-free oil of opposite charge or alternating net positive and net negative contaminant-free oil streams may be used instead for the purposes of agglomeration prior to collection (in the first case) or multilayer precipitation (in the second case—e.g., collecting a net negative layer then a net positive layer, and so forth, of water phase).

Suitably, the charge injector 1 is constructed in accordance with the teaching of the aforesaid U.S. Pat. No. 4,255,777, to which reference is made for a more complete disclosure of the construction and operation of the charge injector. However, in substance, such a charge injector, as shown, essentially comprises an upright, suitably cylindrical, chamber 2 through which the mixture passes, having a bottom wall 13, with an orifice or opening 3, at one end and a sharply pointed electrode 4 connected to the high potential terminal of voltage power supply 5 whose earth terminal is grounded at 12, the tip of the electrode 4 being located closely above, and in axial alignment with, the opening 3. The chamber bottom wall 13 serves as a second electrode which is maintained at a lower voltage, relative to earth, than pointed electrode 4, by means of a connection to earth 12, which can be made through a resistance element 15. Charge is injected by the pointed electrode 4 into the contaminant-free oil issuing through the spray opening 3 and the charged oil issues or sprays into the vessel 6 which is located below the charge injector 1. A horizontal metallic gauze 30 located within vessel 6 approximately half-way up its height on an internal supporting shoulder 31 is also connected to earth 12 and completes the electrical circuit of the charge injector. A bed of densely packed collector beads 32 of glass or similar essentially non-conductive material rests on the gauze 30 and occupies approximately half of the volume within vessel 6 above the gauze. Mixing chamber 33 serves as a primary conglomerating region occupying the space above the beads 32, and the volume occupied by the beads themselves constitutes a secondary conglomerating region. An alternative location for the gauze electrode is between the primary and secondary conglomerating sections and is shown at 31a in FIG. 1. In this arrangement, other means for supporting the bed of collector beads 22 would need to be provided. Thus, the vessel interior comprises, working from the top downwards, the primary conglomerating section, serving as mixing chamber 33, which is free of any collector surfaces apart from the internal wall regions of vessel 6, the secondary conglomerating section 34 occupied by the beads 32 and separation region 35 in which the mixture of the oil-in-water emulsion and the contaminant free oil breaks up into a charged water-in-oil layer 36, an oil layer 37 and a water layer 38. Layers 36 and 37 may, to some extent, merge or overlap. The beads suitably are glass beads, but they may instead be made of other materials of low conductivity, e.g., plastics or ceramics generally.

Suitably as shown, a line 43, including pump 44, branches out from outlet pipe 18 upstream of valve 19 and leads back to the inlet of charge injector 1, so that clarified oil is delivered to the charge injector inlet. This avoids the need for a separate supply of contaminant-free oil.

The stream of oil issuing downwardly through opening 3 generally breaks into a spray at a short distance below the spray opening in air gap 11, depending on the charging potential of the charge injector, but the existence of a spray is not critical to the effective operation of the separation apparatus. The separation vessel 6 is provided in the bottom thereof with an outlet pipe 16, including a valve 17, for discharging water from the separation vessel. Similarly, the vessel 6 has in its side wall an outlet pipe 18, including a valve 19, located above the oil/water interface for releasing clarified oil from vessel 6.

It is to be noted that because of the very large cross-sectional area of the interior of vessel 6 as compared with that of the stream of charged phase mixture emerging through orifice 3, the stream velocity through the charge injector 1 is relatively high, so as to ensure an adequate level of charge injection, whereas the downward velocity of the body of liquid in vessel 6 is very small indeed. Purely by way of example, typical dimensions for the internal cross-sectional diameter of the separation vessel and the spray outlet diameter are 10 cms and 0.05 cm respectively.

In operation, with valves 17 and 19 set to determine flow rates for clarified water and oil which match the oil flow rate through delivery line 42, or by selective opening and closing of valves 17, 19 so as to maintain the body of liquid in vessel 6 at an approximately constant level close to the top of the separation vessel, excess charge carriers are induced to be emitted into the emulsion to be broken from the sharply pointed end of electrode 4 when this electrode is maintained at a sufficiently high negative potential with respect to spray opening 3. The charge carriers are then swept from the pointed electrode 4 by the cross flow of the oil issuing through the orifice 3. Within upper region 33 of separation vessel 6, the charged oil and the introduced water-in-oil emulsion become mixed passively and the major portion of the charge becomes transferred to the water droplets, so as to drive the droplets towards the bounding wall surfaces of separation vessel 6. The internal dimensions of separation vessel in region 33 are chosen to be larger than the mean inter droplet spacing within the continuous oil phase. In this way coalescence of the migrating water droplets will occur for many of the water droplets within primary conglomerating region 33 before the droplets reach the internal wall surfaces of the separation vessel, and larger water droplets are thus formed. Other droplets will reach the inner wall surfaces of the separation vessel and may coalesce there, to form larger droplets which tend to break away from the wall surfaces, or may form a continuous film of water on the separation vessel wall. The consequence of all these effects is that water settles, due to the effects of gravity and downward flow within separation vessel 6, the downward settling being superimposed on the droplet migration in the generally radial direction, and the droplets accordingly encounter the collector beads in secondary conglomerating section 34, on whose exposed surfaces the droplets coalesce further, and then become detached from the bead surfaces and separate out to form a bottom, water layer 38. It will be appreciated that the close packing of the beads provides very short migration paths for the droplets to enhance water separation. The oil from which the water droplets have been removed tends to separate out into oil layer 37 floating on top of water layer 38, water-in-oil emulsion occupying the remainder of the volume taken up by the body of liquid in vessel 6 and which fills section 33, the interstices between the beads, and water/oil layer 36. Where valves 17, 19 are set to define predetermined flow discharge rates for the clarified water and oil phases, an optional level control arrangement can be used to keep the level of the oil mixture in section 33 substantially constant, this arrangement comprising a controller 40 which responds to the level detected by a level sensor 39 and controls the opening of a regulator 41 in the input line 42 so as to reduce any error between the output from level sensor 39 and an input signal representing the desired level.

Referring now to FIG. 3, there is shown separation apparatus that is specially suitable for separating small particles of solid contaminant from a liquid background phase, for example white mineral oil contaminated with carbon black particles.

In this embodiment, there is not shown any re-cycling of clarified oil from the bottom of the separation vessel 6 back through the inlet of charge injector 1, although such an arrangement is quite feasible. The main difference over the FIG. 2 embodiment resides in the fact that, here, the bed of glass beads occupies substantially the whole of the volume within the separation vessel 6 above the metallic gauze 30. In operation, the contaminated oil and charged contaminant-free oil become mixed passively within the upper section of the separation vessel and migration of the carbon black particles under the action of the induced electric field occurs as described previously. Because of the short migration path to the collector surfaces provided by the densely packed beads throughout the mixing chamber provided within the separation vessel 6, the carbon black particles build up on the beads and the clarified oil becomes increasingly clear at increasing depths within the separation. The oil in vessel 6 below the metallic gauze 30 is substantially free of carbon black particles and can be tapped off continuously or periodically through valve 19. The level of the oil in separation vesel 6 is suitably maintained just covering the beads 32. This can be achieved manually or automatically, for example using a level control arrangement as described above with reference to FIG. 2.

After a certain time of use, the outer surfaces of the beads and the interstices between neighbouring beads will become partially or completely fouled with deposited carbon black. This fouling should then be removed at intervals, for example by back flushing, scrubbing or replacement of the beads with fresh beads.

Another modification shown in FIG. 3 but which could equally be adopted both in the described FIG. 2 embodiment and in the FIG. 4 apparatus to be described below is that the space 11 is enclosed by a frusto-conical shaped cap 50 on top of the separation vessel 6, the charge injector body being mounted on this cap. A single pipe 51 can serve to provide open communication between the air space 11 and the atmosphere, or a purge gas, e.g., nitrogen, can be circulated through the gas space 11 via inlet and outlet pipes 52, 51 in the wall of the frustoconical cap, thereby avoiding any risk of explosion or chemical reaction. In another arrangement, the gas space 11 is pressurized to increase the liquid throughput in the separation vessel 6.

As already described, the FIG. 3 arrangement with glass collector beads is ideally suited for separating a particulate contaminant from a liquid. It is not so suitable, however, where the contaminant is a liquid phase, e.g., as in the case of a water-in-oil emulsion, because with very small contaminant droplets, glass beads may not promote a sufficient degree of coalescence and this can prove a limitation on the separation efficiency and effectiveness. (It should be noted that the FIG. 1 embodiment does provide effective separation, despite using glass beads, since it includes the primary coalescing region which effects preliminary coalescence which the glass beads are then capable of converting into further coalescence and settlement of the fully grown water droplets). However, when porous beads are employed in FIG. 3 in place of the glass beads, effective separation of the microscopic water droplets can be obtained.

Referring now to FIG. 4 which again depicts an apparatus which is suitable for separating carbon black particles from a white mineral oil, the main difference here is that there are no collector beads at all inside the separation vessel 6 and, in place of the metallic grounded gauze of the FIG. 3 embodiment, the vessel 6 itself is made of metal and is grounded at 12 as shown. In operation, the migrating carbon black contaminants will travel towards the boundary of the liquid mixture in separation vessel 6, until the contaminant particles encounter the inner wall surface regions of separation vessel 6, on which the contaminant collects. The fouling by deposited carbon black particles on the inside of the separation vessel can be removed periodically in any suitable manner, such as is well known in the art.

A stationary bed of beads need not necessarily be used. For example, in the FIG. 2 embodiment, a bead inlet could be provided just below the top of secondary conglomerating region 34 and a bead outlet at the bottom of that region, so as to seed the liquid passing from the primary to the secondary conglomerating section. In FIG. 3, such seeding could be achieved by introducing collector beads into the contaminantladen stream before it enters the separation vessel and removing the beads at a downstream location, for example in the separation vessel itself.

Figure 4:
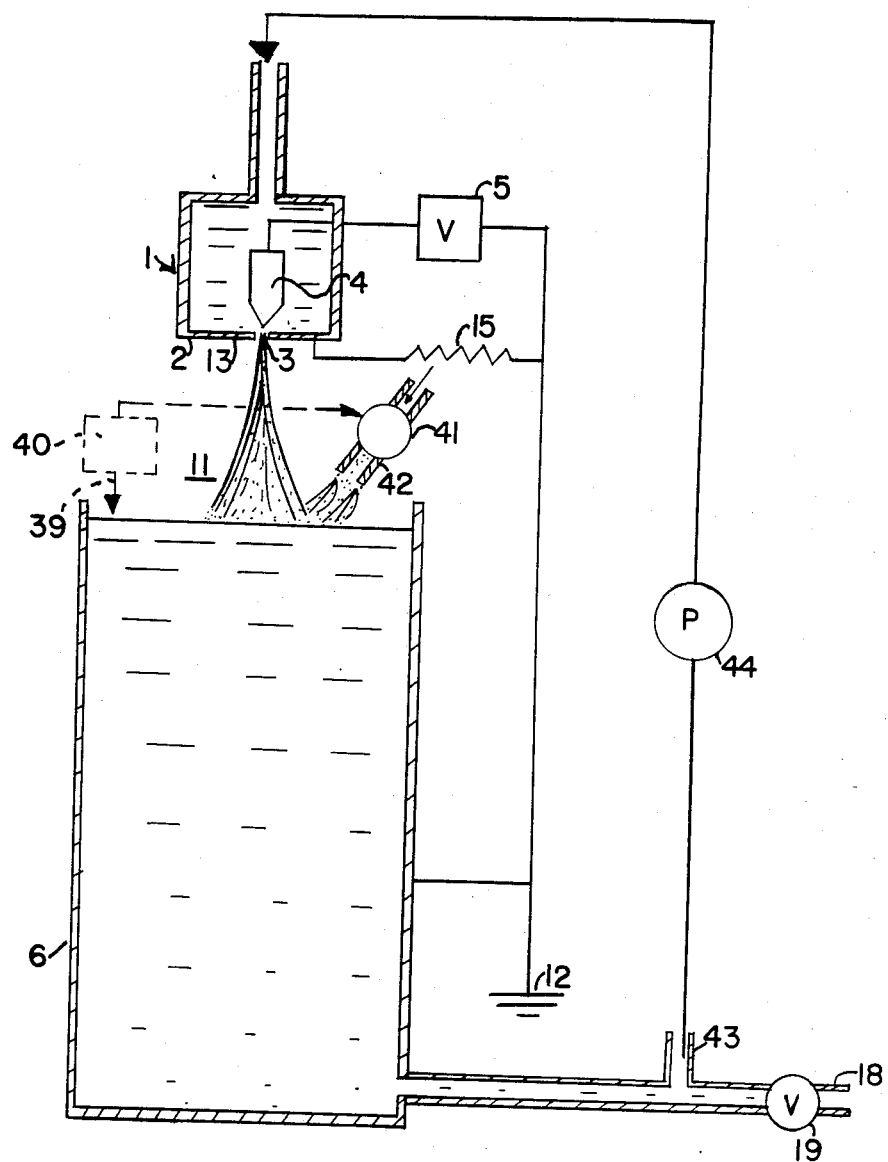

For a more complete description of the principles involved in the separation of the contaminants from the continuous liquid background phase in each of the FIGS. 2 to 4 embodiments, reference is hereby directed to co-pending U.S. Pat. application Ser. Nos. 601,254, 601,271, 601,275 and 601,276, all assigned to the present assignees and filed on the same day as the present application, the contents of which are expressly incorporated herein by reference.

What is claimed is:

1. A method of charging a dispersed contaminant phase in a continuous liquid phase, comprising the steps of:
   (1) introducing a net unipolar charge into a further liquid that is substantially free of any dispersed contaminant phase; and
   (2) causing the dispersed contaminant phase to become charged by bringing the contaminated and substantially contaminant-free liquids into contact with one another and allowing charge from the substantially contaminant-free liquid to be volumetrically distributed through the continuous liquid phase of the contaminated liquid to the dispersed contaminant phase.

2. A method as claimed in claim 1, wherein the substantially contaminant-free liquid is identical to the continuous liquid phase of the comtaminated liquid.

3. A method as claimed in claim 2, wherein the contaminated and substantially contaminant-free liquids are brought into contact with one another in a mixing chamber.

4. A method as claimed in claim 1, wherein the charge which is introduced into the substantially contaminant-free liquid is free charge which is net unipolar, the free charge being introduced by field emission.

5. A method as claimed in claim 4, wherein the charged substantially contaminant-free liquid is directed as a stream or spray through a gas or vapor space before coming into contact with the contaminated liquid, said gas or vapor space serving to at least minimise charge dissipation from where the contaminated and substantially contaminant-free liquids are brought into contact with one another to where free charge is field emitted into the substantially contaminant-free liquid.

6. A method for use in separating dispersed contaminant phase from a continuous liquid phase by producing migration of dispersed phase within the continuous liquid phase, said method comprising the steps of:
   (1) introducing free charge that is net unipolar into a further liquid that is substantially free of any dispersed contaminant phase, at least predominantly by electron emission;
   (2) causing the dispersed contaminant phase to become charged by bringing the contaminated and substantially contaminant-free liquids into contact with one another in a chamber containing a body of liquid comprising said contaminated and substantially contaminant-free liquids and by allowing charge in the substantially contaminant-free liquid to be volumetrically distributed through the continuous liquid phase of said body of liquid to the dispersed contaminant phase, there being a sufficient excess of free charge introduced in step (1) such that the volumetric charge distribution causes both an electric field to be induced in said body of liquid and the dispersed contaminant phase to become charged, and the induced electric field and the charge on the dispersed contaminant phase interact to produce an electrical driving force acting on the dispersed contaminant phase so that said migration is due substantially to said driving force; and
   (3) collecting the migrating dispersed contaminant phase for separation from said body of liquid.

7. A method as claimed in claim 6, wherein the substantially contaminant-free liquid is identical to the continuous liquid phase of the contaminated liquid.

8. A method as claimed in claim 7, wherein the migrating dispersed contaminant phase is collected in one region within said chamber leaving substantially contaminant-free liquid in another region, and wherein liquid from that other region is recycled and used as the substantially contaminant-free liquid into which the free charge is introduced.

9. A method as claimed in claim 6, wherein the contaminated liquid is a water-in-oil emulsion and the substantially contaminant-free liquid is oil.

10. A method as claimed in claim 6, wherein the free charge is introduced into a flow of substantially contaminant-free liquid, at least predominantly by field emission, and the charged substantially contaminant-free liquid is passed as a stream or spray through a gas or vapor space before coming into contact with the contaminated liquid, said gas or vapor space serving to at least minimise charge dissipation from where the contaminated and substantially contaminant-free liquids are brought into contact with one another to where the free charge is field emitted into the substantially contaminant-free liquid.

11. A method as claimed in claim 10, wherein said flow of substantially contaminant-free liquid is charged by being flowed past a pointed high-potential electrode at sufficient velocity that free charge that is net unipolar is injected by field emission into the flow of substantially contaminant-free liquid and is conveyed thereby away from the high-potential electrode.

12. A method as claimed in claim 6, wherein the free charge is introduced into the substantially contaminant-free liquid without producing ionic dissociation within the substantially contaminant-free liquid.

13. A method as claimed in claim 6, wherein the dispersed contaminant phase is a dispersed liquid phase and the migrating dispersed liquid phase is allowed to undergo initial conglomeration and droplet size growth in a first region within said chamber which is devoid of any exposed surfaces apart from the inside surface areas of the chamber wall, and further conglomeration and droplet size growth in a further region within said chamber containing a bed of closely packed elements of low electrical conductivity, whereby the liquid forming the dispersed liquid phase and the continuous liquid phase itself separate by settling into discrete liquid layers in a third region within said chamber.

14. A method as claimed in claim 6, wherein the dispersed contaminant phase comprises dispersed particles in the solid state and the migrating particles are collected on the exposed surfaces of a plurality of densely packed elements of low electrical conductivity filling a major proportion of the entire volume of the chamber occupied by said body of liquid, and wherein liquid remaining after the particles originally therein have been collected on the exposed surfaces of the densely packed elements is removed from said chamber.

15. A method as claimed in claim 6, comprising the further steps of:
   (4) separately removing collected dispersed phase and substantially contaminant-free liquid periodically or continuously from said chamber; and
   (5) supplying the substantially contaminant-free liquid to said chamber at a controlled rate so as to maintain the level of said body of liquid in said chamber substantially constant.

16. Apparatus for use in separating a dispersed contaminant phase from a continuous liquid phase by producing migration of dispersed phase within the continuous liquid phase, comprising:
   (1) a separator including a chamber;
   (2) means for introducing the contaminated liquid into said chamber;
   (3) means for introducing free charge that is net unipolar into a further liquid that is substantially free of any dispersed contaminant phase, at least predominantly by electron emission;
   (4) means for introducing the charged substantially contaminant-free liquid into said chamber for contact with the contaminated liquid there and so as to provide a body of liquid in said chamber comprising said contaminated and substantially contaminant-free liquids, whereby charge in the substantially contaminant-free liquid becomes volumetrically distributed through the continuous liquid phase of said body of liquid to the dispersed phase, so that with a sufficient excess of free charge introduced by the charge introducing means, the volumetric charge distribution causes both an electric field to be induced in said body of liquid and the dispersed contaminant phase to become charged, and the induced electric field and the charge on the dispersed contaminant phase interact to produce an electrical driving force acting on the dispersed contaminant phase so that said migration is due substantially to said driving force and said separator collects migrating dispersed contaminant phase and separates said body of liquid into collected dispersed contaminant phase and substantially contaminant-free liquid; and
   (5) means for recycling substantially contaminant-free liquid from the separator back through the free charge introducing means for use as said substantially contaminant-free liquid into which free charge is introduced.

17. Apparatus as claimed in claim 16, wherein said free charge introducing means comprises a charge injector arranged to inject charge into the substantially contaminant-free liquid by field emission, said charge injector being positioned spaced away from said separator so as to provide a gas or vapor space between the charge injector and the separator, the charge injector being arranged to cause the charged substantially contaminant-free liquid to stream or spray through said gas or vapor space which serves to at least minimise charge dissipation from the body of liquid in said chamber back to the charge injector.

18. Apparatus as claimed in claim 17, wherein the gas or vapor space is enclosed and means are provided for circulating a purge gas through said enclosed space.

19. Apparatus as claimed in claim 17, wherein the charge injector comprising a high-potential electrode having a pointed end, a low-potential electrode arranged in the proximity of the tip of the high-potential electrode, the low-potential electrode defining a discharge opening close to and in alignment with the tip of the high-potential electrode, and means for flowing substantially contaminant-free liquid past the tip of the high-potential electrode and through the discharge opening in the low-potential electrode so that charge is injected by field emission from the high-potential electrode tip into the flow of substantially contaminant-free liquid.

20. Apparatus as claimed in claim 17, wherein a regulator is provided for regulating the rate of supply of the substantially contaminant-free liquid to the charge injector and the separator is provided with means responsive to the level of said body of liquid in the separator for controlling the regulator so as to maintain said level substantially constant.

21. Apparatus as claimed in claim 16 for use in separating a dispersed liquid phase from a continuous liquid phase, wherein the separator comprises a separation vessel defining said chamber therein, said chamber having a first region therein which is devoid of any exposed surfaces apart from the inside surface areas of the separation vessel wall and which allows the migrating dispersed liquid phase in that region to undergo initial conglomeration and droplet size growth, and a second region containing a bed of closely packed elements of low electrical conductivity, said second region causing the migrating dispersed phase in that region to undergo further conglomeration and droplet size growth until the liquid forming the dispersed liquid phase and the continuous liquid phase itself separates by settling into discrete liquid layers in a third region within said chamber.

22. Apparatus as claimed in claim 21, wherein said densely packed elements of low electrical conductivity comprise a bed of glass beads.

23. Apparatus as claimed in claim 16 for use in separating dispersed particles in the solid state from a continuous liquid phase, wherein the separator comprises a separation vessel defining said chamber therein and a major proportion of the entire volume of said chamber occupied by said body of liquid is filled by a plurality of densely packed elements of low electrical conductivity for collecting migrating particles on the exposed surfaces thereof, the separator being provided with means for removing liquid remaining in the separator after the particles originally therein have been collected on the exposed surfaces of said densely packed elements.

24. Apparatus as claimed in claim 23, wherein said densely packed elements of low electrical conductivity comprises a bed of glass beads.

25. Apparatus as claimed in claim 16 for use in separating dispersed particles in the solid state from a continuous liquid phase, wherein the separator comprises a separation vessel defining said chamber therein, said chamber being devoid of any exposed surfaces therein apart from the inside surface areas of the separation vessel wall so that migrating dispersed particles migrate to and collect on the inside surface areas of the separation vessel wall leaving substantially contaminant-free liquid in said separation vessel, and wherein said separation vessel is provided with means for discharging substantially contaminant-free liquid from the separation vessel periodically or continuously.

* * * * *